Nov. 4, 1958 M. E. SANFORD 2,859,110
METHOD AND APPARATUS FOR TREATMENT OF WASTE PAPER STOCK
Filed March 26, 1956
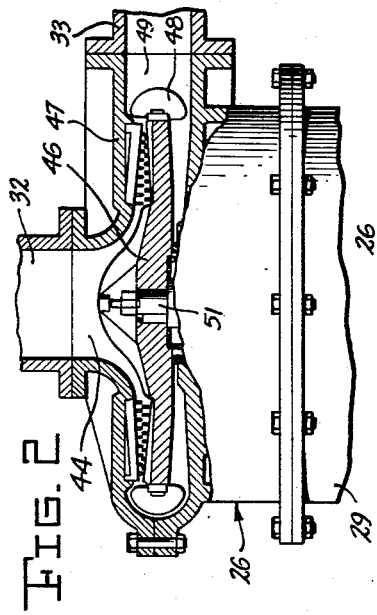
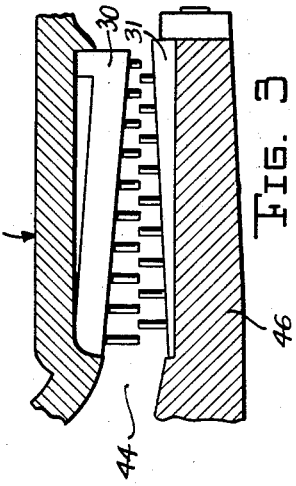
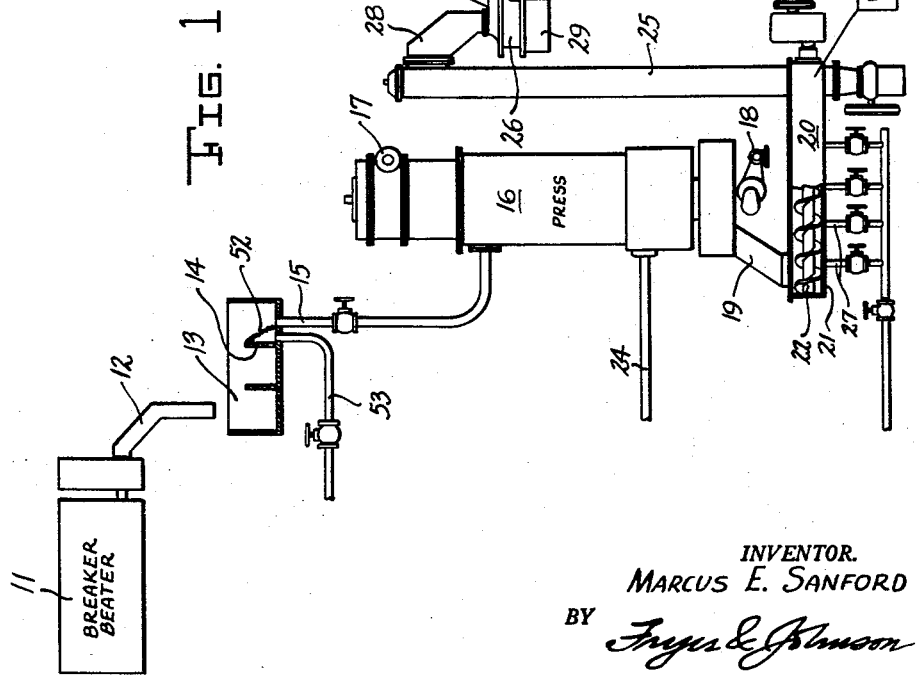
INVENTOR.
MARCUS E. SANFORD
BY
*Fryer & Johnson*
ATTORNEYS

2,859,110

METHOD AND APPARATUS FOR TREATMENT OF WASTE PAPER STOCK

Marcus E. Sanford, San Francisco, Calif., assignor to Fibreboard Paper Products Corporation, a corporation of Delaware Application March 26, 1956, Serial No. 573,981

11 Claims. (Cl. 92—20)

This invention relates generally to the manufacture of paper. More particularly, it relates to improved ways and means for cleaning paper pulp stock made from waste paper to remove impurities therefrom prior to forming such stock into paper or paperboard. The invention has particular reference to treating wax-bearing waste paper stock to disperse and assimilate its wax content uniformly throughout the mass of fibers of the stock to thereby avoid undesirable consequences of wax spots on the surface of finished paper.

In the manufacture of paper, particularly lower grades of paper such as used as liners for corrugated paperboard, extensive use is made of waste paper as a source of pulp stock. In such processes, waste paper is collected, disintegrated in conventional beaters which agitate it in a turbulent liquid bath to render it into a fiber containing slurry; large foreign objects which are inevitably present in waste paper are removed and the slurry is then further refined to defiberize or defibrate it to break up fiber agglomerates and separate the individual fibers. The slurry is then usually screened to remove residual foreign particles and used as stock for paper making in accordance with conventional processes.

Although the foregoing prior process has been in use for some time, it is still not all that is to be desired for a number of reasons. In the first place, waste paper inevitably includes some wax-bearing papers; and the wax, which is not separable from the stock by usual methods such as screening, eventually appears as spots on the surface of finished paper. Wax spots are objectionable because they detract from appearance of the paper and also adversely affect its amenability to printing or gluing. Consequently, such wax is a cause of rejection or downgrading of much finished paper and so poses a serious economic problem.

To minimize the wax problem, current practice is to specify that waste paper be free of wax or waxed paper. Consequently, waxed paper is a drug on the market as it is not usable for paper production in accordance with previously used methods. Moreover, even though specified to be wax free, waste paper invariably contains some waxed paper which cannot be economically sorted out by hand and which contributes to the above mentioned rejection or downgrading of finished paper.

Another problem of the above described prior process lies in removal of smaller foreign material such as asphalt flakes, small mortar flakes or dirt, etc. In accordance with conventional practice in the above described prior processes, slurry from which relatively large foreign objects have been removed is defibrated or refined, usually between two relatively moving opposing discs, or concentric cones as in the well known Jordan machine, to break up agglomerates of fibers.

This refining operation separates fibers and at the same time releases or separates relatively small foreign materials entrapped in agglomerates of fibers. The refined slurry is then screened to remove separated foreign materials. However, removal of foreign materials in the screening operation is often inadequate because the usual defibrating methods employed in the above described prior processes grind the foreign materials into fine particles. The result is that at least part of such foreign materials are reduced to the same size range as the paper fibers so pass through the screen with them and eventually show up in the finished paper. Asphalt is particularly troublesome in this respect because it is usually present in the slurry as flakes which are broken up in the usual defibrator into very small pieces which readily pass through the screen with the fibers and so are present in finished paper.

In summary, the present invention overcomes the above mentioned difficulties of prior processes and to that end provides ways and means for avoiding the deleterious effects of wax in waste paper which is used for subsequent formation into paper, thereby enabling the use of cheaper grades of waste paper and eliminating the necessity for hand sorting. The invention also provides an improved system for defibrating or refining paper pulp whereby desired separation or reduction of agglomerates of fibers is accomplished without grinding of either fibers or foreign particles thereby efficaciously refining such pulp and enabling removal of residual foreign particles therefrom. In other words, fibre agglomerates are reduced while foreign particles are left in an unreduced state.

Thus, the invention provides a method and apparatus for cleaning waste paper stock to disperse wax uniformly therethrough and also to remove residual foreign materials therefrom thereby enabling efficacious employment of low grade waste paper in the production of paperboard or low grade paper.

In accordance with the invention, wax is rendered unobjectionable by treating waste paper stock in a particular manner under controlled conditions to effect dispersion of wax uniformly throughout such stock on the fibers thereof, thus preventing its appearance as spots on the finished paper. This is accomplished by forming a slurry of the waste paper stock and then dewatering the slurry to form a thickened pulp in which substantially all water is absorbed in the cellulosic fibers. Such thickened pulp is in the form of a kneadable mass containing substantially no non-absorbed or free water in contradistinction to a slurry or suspension of the fibers in water. Such thickened pulp is of high consistency compared to the lower consistencies of paper fibers in a slurry or suspension in water. For reasons explained more fully hereinafter the advantages of this invention cannot be obtained by handling low consistency paper slurry or suspensions. The thickened pulp of this invention should be of a consistency of at least about 20% for best results, and desirably higher. As used in this specification, consistency is calculated as (weight of dry solids in pulp/total weight of wet pulp) ×100.

After forming such thickened pulp, it is heated to a temperature above the melting point of waxes to be dispersed but below the melting point of higher melting impurities, such as asphalt, contained in the pulp, while desirably simultaneously agitating the same to insure thorough mixing and thereby thorough heating and thus enhance dispersal of melted wax therethrough. The resultant mass is then defiberized or defibrated by a kneading action without grinding individual fibers or breaking up foreign particles contained therein, and after defibrating, is diluted to provide a low consistency aqueous slurry from which the foreign particles can be removed by conventional means such as simple screening.

It is important that before heating, the pulp be thickened to a relatively high consistency to insure proper dispersal of wax throughout the mass of fibers. This is so, because at lower consistencies, say below about 15% solids, there is so much liquid present that most of the wax upon heating will melt and either form a relatively dilute emulsion or float on the free water, and is not efficiently contacted by the fibers. Consequently, a large proportion of the wax will not be uniformly deposited on fibers and will, upon subsequent cooling of the stock, be deposited randomly on fibers and thus show up as wax spots on finished paper. Moreover, free wax may cool and solidify on equipment thus causing undesirable wax buildups and necessitating shut down for cleanout. Such cleanout is required because relatively large pieces of such solidified wax may break away and eventually show up as spots on finished paper.

At consistencies above about 20%, there is no free water unabsorbed by the fibers and so the melted wax is brought into efficient contact with the fibers for dispersal uniformly throughout the entire mass of pulp. As a result, paper made from such pulp will have no imperfections due to wax spots on the surface.

In this connection, it is to be noted that the melted wax is apparently taken up primarily by deposit on surfaces of individual fibers which, from all observations, have an affinity for melted wax. Some melted wax may actually be absorbed into individual fibers by capillary action. However, regardless of how the wax combines with the pulp, the important factor is to obtain complete and thorough wax dispersal; and to insure this, the pulp is desirably agitated during or after heating to insure complete heating of the pulp to attain such dispersal. Such agitation need not be violent, and suitable agitation is attained concomittantly with heating by moving the pulp through a screw conveyer during such heating.

As to maximum consistency of the pulp during the wax dispersal step, this is relatively unimportant insofar as functional effect concerning dispersal of the wax is concerned. Higher consistencies do however offer an economic advantage in heating in that in higher consistency pulp there is less water to absorb heat. However, the consistency should not be so high as to render the pulp difficult to handle in currently available equipment. A consistency of a maximum of about 50% is as high as is to be obtained by employing higher consistencies. It should be noted, however, that higher consistencies in the range noted should be employed for higher wax content pulp as that will make the wax dispersal more efficient, because the higher the consistency the better the dispersal of the wax.

Heating of thickened pulp to disperse wax may be accomplished by any suitable method and by either direct or indirect heating. However, direct heating by injecting saturated steam (212° F.) into the thickened pulp is desirable because of its economy and efficiency and also because such steam injection into pulp as it is agitated, as in a screw conveyer, will also contribute some agitation as well as insure more efficient heating.

Due to the relatively low temperatures required by the invention, as hereinafter discussed, relatively little steam is required to effect heating and so the quantity of moisture introduced by the steam is negligible and will not materially lower the consistency of the thickened pulp.

However, if because of local conditions there is danger of diluting the pulp too much, then it can be initially thickened to a higher consistency, or non-diluting heating means employed.

In connection with heating of the pulp, it is to be noted that it is accomplished at substantially atmospheric pressure, thus enabling the use of ordinary saturated steam (212° F.) and also avoiding problems and atmospheric pressure, thus enabling the use of ordinary saturated steam (212° F.) and also avoiding problems and expense attendant upon using sealed equipment in which pressured steam or gas is employed. The use of relatively low temperature and non-pressured apparatus is possible with the present invention because only the waxes, which have relatively low melting points (120–200° F.), are melted and dispersed. Impurities, such as asphalt, which have much higher melting points are deliberately left in the unmelted or solid stage, or in other words as discrete solid particles, so that they are not dispersed into the fibers and are amenable to physical removal methods, such as subsequent screening.

It is important that the entire thickened pulp mass be thoroughly heated throughout to insure substantially complete melting of the wax. All observations indicate that the wax disperses substantially immediately as it is melted provided the pulp is of a consistency above 20%; the uniform dispersal being facilitated by simultaneous agitation of the pulp with the heating thereof. Thus, there is no need for maintaining the pulp at final wax melting temperature for any particular time period after the entire mass of pulp has reached such temperature. In this connection it is noted that the time required to bring the entire mass of pulp to wax dispersing temperatures, including the size of equipment, quantity of pulp, and quantity of heat added per unit of time. However, in most cases, using equipment of the type hereinafter ture is not critical and will depend upon several vari- described, such heating may be accomplished in from 20 to 60 seconds and so the process is very efficient from a time standpoint.

The temperatures employed are such that the melting points of the highest melting waxes to be dispersed are exceeded. In general, waxes present in waste paper are mixtures of crystalline wax, such as used in waxed paper, and higher melting microcrystalline waxes employed for special uses to withstand high temperatures. Crystalline waxes have melting points in the range from 110°–165° F. while microcrystalline waxes have melting points up to about 200° F. Temperatures to be employed in processing pulp in accordance with this invention will depend primarily upon the type of wax present in the pulp. However, to insure substantial dispersal of all types of waxes, the pulp is heated to a temperature in the range from about 180° F. to 200° F. If it is known that microcrystalline waxes are absent from the pulp, then lower temperatures to disperse only crystalline waxes may be employed.

The relative quantity of total wax present in the pulp stock is not a practical factor in this invention because tests have demonstrated that pulp containing as much as 15% by weight wax (dry basis; pulp solids to wax) can be effectively treated in accordance with the invention. Waste paper consisting of 100% waxed paper contains only about 10% wax by weight. Thus, it is apparent that the usual waste paper, which is a mixture of waxed and unwaxed papers, will contain less than about 10% wax, consequently the invention can be employed to efficiently cleanse waste paper pulp stock made from any waste papers currently extant since none of them will exceed 10% wax and the process can handle at least 15% wax.

When the wax has been dispersed by heating as above described, the pulp is then subjected to a particular refining or defibrating operation in which the fibers are separated into substantially individual fibers to prepare the pulp for use in paper formation, but without undesirable grinding or breaking up of foreign particles. In other words, the pulp is refined to reduce fiber agglomerates or separate fibers while leaving foreign materials in a substantially unground or unreduced state. Also such particular defibration, which is a combing or kneading action does not grind up individual fibers. Grinding of fibers is undesirable because extremely short fibers do not properly interlace and mat in subsequent paper making.

Thus, in accordance with a feature of this invention, the pulp is defibrated by a kneading or combing action between spaced apart members, such as between spaced apart pins or fingers which rotate or otherwise move at high speed relative to each other but without engagement with each other and thus pull apart agglomerates of fibers into individual fibers. Since the defibrating members are spaced apart and do not engage each other, there is no grinding of individual fibers or foreign particles. When properly defibrated, the fibers are of a much finer and smaller size than most of the foreign particles and upon dilution of the defibrated pulp to form an aqueous slurry or suspension, they can be readily separated from the foreign particles by known means such as screens and the like. In this connection, if the pulp consistency is too low so that there is excess unabsorbed water, the mass cannot be defibrated without also grinding up the foreign particles. Hence the thick pulp is also important to permit defibration by the described combing or kneading action which results in the defibration as a result of friction between the fibers, and does so without breaking up the larger foreign particles.

Reference is made to the accompanying drawings which form a material part of this specification and which illustrate a preferred embodiment of the invention. It is to be understood, however, that the embodiment described hereinafter is for purposes of illustration only and is not to be considered as limiting this invention since the scope thereof is defined by the appended claims rather than by the description preceding them.

In the drawings:

Fig. 1 is a more or less schematic elevational view, partly in section, of a form of a stock cleaning system embodying the invention.

Fig. 2 is a fragmentary elevational view, partially in section, of a defibrating machine for refining or defibrating pulp in accordance with the invention.

Fig. 3 is an enlarged partial section of the right hand side of the machine shown in Fig. 2, illustrating the opposing sets of pins in more detail.

In the system shown in Fig. 1 which embodies conventional equipment units, waste paper bales are broken up and the paper rendered into a dilute slurry in a conventional breaker-beater or "Hydrapulper" 11 which hence provides a supply source for the remainder of the system. The pulp is then passed through a conduit 12 into a head box 13. Consistency of the pulp as received in the head box is usually in the range of 1% to 4% solids. The head box is provided with usual baffles 14 to minimize turbulence therein and deliver the slurry at a controlled volume through conduit 15 into a thickening or dewatering press 16. Such press 16 is of conventional design suitable for thickening or dewatering pulp to a consistency in the range from 20% to 50%. The press illustrated, which may be of any well known type, is a screw press, driven in a conventional manner through gear box 17 by means of a suitable motor (not shown).

Thickened pulp is discharged from the bottom of the press by means of an internal screw discharge (not shown) and scraped by scrapers driven in conventional manner by motor 18, to drop into and through a chute 19 into a wax dispersal unit 20 which includes a housing 21 and a horizontal screw agitating conveyer 22 within the housing where it is heated as hereinafter described. The conveyor is driven by a suitable motor 23. Liquid extracted from pulp in the press is discharged in conventional manner through conduit 24 and returned to process or discarded.

Horizontal screw conveyor 22 agitates the pulp while conveying it through the wax dispersal unit 20 to a vertical screw conveyor 25, driven by a suitable motor (not shown) and which delivers the pulp to a defibrating machine 26.

In order to disperse wax, the pulp is heated as it passes through horizontal screw conveyor 22, sufficient heat being added to bring the pulp to a temperature above the melting point of the wax.

In the embodiment shown, heating is done by means of saturated steam injected directly into housing 21 of the wax dispersal unit through valved steam lines 27 to permeate and heat the pulp as it passes therethrough. Such housing is not sealed because the heating is accomplished at substantially atmospheric pressure. In this connection, it will be noted that other types of conveyor and other heating means may be employed. However, it is desirable that the conveyor and heating means be such that agitation or mixing of the pulp occurs during heating so that uniform heating and thorough dispersal of wax will be attained simultaneously.

The thickened and heated pulp, which now has its wax content dispersed uniformly throughout its mass, is conveyed by means of vertical conveyor 25 to gravity discharge through a conventional chute 28 into the defibrating machine 26 which is driven by a suitable motor 29. In such defribrator the pulp is subjected to a kneading or combing action which is accomplished in the embodiment illustrated by means of two opposing sets of pins 30 and 31 one of which rotates with respect to the other to effect kneading of the pulp by a combing action as it passes radially (i. e. in a direction transverse to movement of the pins) from the inlet 32 at the upper central portion of defibrating machine 26 to the periphery thereof whence it is discharged (Figs. 2 and 3).

The refined and defibrated pulp passes through conduit 33 into a conventional dilution tank 34 in which it is suitably diluted to a dilute suspension capable of subsequent screening, usually of a consistency of less than about 2%. However, in this connection, the pulp may be diluted to any consistency in which there is sufficient free water present to enable subsequent screening or other treatment for separating foreign particles from the stock.

Water is furnished to the dilution tank through a usual valved conduit 36 and diluted pulp therein is agitated by a conventional paddle (not shown) to keep fibers in suspension. A conventional overflow weir 37 is provided to maintain a liquid level in tank 34 and to furnish a discharge zone 38 from which diluted stock may be discharged, via conduit 39, into a conventional screen 41 in which residual foreign material is removed from the pulp. Screened product stock is discharged from screen 41 through a conduit 42 to further processing in accordance with conventional practice for forming paper from refined stock. Foreign particles are discharged from such screen 41 through conduit 43. With respect to the screening operation, this is a desirable step to remove foreign particles, however, if the waste paper stock is relatively free of foreign particles, or if the presence of such foreign particles in the final paper is not objectionable, then the screening may be omitted as the preceding wax dispersal step will have dispersed the wax. Also, if the screening is omitted, prior defibrating machines may be employed which grind foreign particles. However, the use of the kneading or combing method of defibrating of this invention is desirable in any case as it avoids undesirable grinding of individual fibers.

Figs. 2 and 3, illustrate details of a preferred type of defibrating machine 26 for use in the system illustrated in Fig. 1. In the construction shown, pulp enters a chamber 44 of the machine at the upper central portion thereof through feed inlet 32 and passes onto the upper surface of a rotating plate 46 on which is mounted one set of pins 31. Due to centrifugal force generated by the rotation of plate 46 the pulp is thrown radially outwardly, thus causing it to pass through a network formed by two opposed series of pins, one series of which 31 is attached to plate 46 to rotate therewith and the other series 30 is attached to a fixed top surface 47 of the chamber 44. In this connection, it will be noted that the pins are spaced apart and substantially parallel thereby forming comb like teeth that do not engage or touch each other as disc 46 rotates.

Consequently, there can be no grinding of either fibers or foreign materials associated therewith. However, the kneading and combing action of the relatively moving spaced apart pins effectively breaks up any lumps or agglomerates of fibrous material and so efficiently refines such material to a state suitable for forming into paper in accordance with conventional practice.

As pulp reaches the periphery of chamber 44, vanes 48 mounted on the periphery of rotating disc 46, act as impellers to discharge defibrated pulp through a discharge outlet 49 connected to a conduit, such as conduit 33 of Fig. 1, leading to a conventional dilution tank.

It will be noted that the pins are positioned with respect to each other so there is substantial space therebetween and upon rotation of disc 46 the series of pins 31 fastened thereto do not contact or intermesh with the opposite series of pins mounted on the top 47 of chamber 44. This is important because if the pins are too close together there will be a grinding of both fibers and foreign materials. This may result in loss of pulp in subsequent screening. Further, such grinding action will also reduce the size of foreign materials to the same size range as the fibers in the stock, thus rendering it impossible to remove such foreign materials from the pulp stock by screening.

Although for removal of foreign particles or refining of pulp without grinding the individual fibers the embodiment illustrated employs a defibrating machine which utilizes pins to effect kneading or combing of the pulp without grinding, it is to be understood that other equivalent machines may be employed to accomplish the same purposes.

As above noted, defibrating machine 26 is driven in a conventional manner by means of a suitable motor 29 connected thereto in such a manner as to rotate a shaft 51 upon which the disc 46 is mounted.

Equipment of the type useful in the present invention may be of any design suitable to accomplish the desired purpose. Thus, the press may be a Model ZL Zenith Press; the screw conveyor used as a wax dispersal unit may be of any standard make and may be insulated if desired for economy; and the defibrator may be a Model 015 "Roto-Pulper." For screening, several machines are available. A typical screen for such use is the Bird Screen Model L–40.

As noted above, consistency of the stock entering the press 16 is usually in the range from 1% to 4%, however operation of press 16 is enhanced if the entering stock has a consistency above about 2%. In the embodiment illustrated, a preliminary dewatering of stock to insure such a consistency is simply accomplished by means of a sloping screen 52 over which stock falls as it overflows weir 14 to enter conduit 15. Water gravity drains from the stock through such screen and is recycled to the breaker-beater or to other use through suitable conduit 53.

*Example 1*

In a pilot plant, a system corresponding generally to Fig. 1 was employed, the breaker-beater and head box were conventional in all respects. A Zenith press, manufactured by Jackson and Church Company having a capacity of 80 tons of pulp solids (dry basis) per 24 hours, was utilized to thicken the pulp to the desired consistency. Suitable well known screw conveyors, dilution tank, and screens were employed. The horizontal wax dispersal unit was 16 inches inside diameter by 12 feet 4 inches long. Such conveyor had a maximum capacity of 150 tons dry weight pulp per 24 hours. A defibrating machine known as the 015 "Roto-Pulper," manufactured by Jackson and Church Company and having a capacity of 75 tons of solids (dry basis) per 24 hours was used to refine the thickened pulp after heating thereof.

Over a 30 day period of operation of the above system, waste paper stock having an average wax content of 2.5% by weight (dry weight) was treated. Average rate of stock throughout was 60 tons pulp (dry weight) per 24 hours. On some occasions stock throughput dropped to 41 tons per 24 hours and on others was as high as 120 tons but such variations did not have any deleterious effect on the process.

Consistency of the stock as it entered the Zenith press during such period ranged from 1.64 to 4.04%; and consistency of thickened pulp discharged from such press was in the range from 33% to 46%. Temperature of thickened pulp leaving the horizontal conveyor 22 was in the range from 160° F. to 195° F. and heating to such temperature was accomplished by injecting steam at 212° F. and atmospheric pressure into the pulp at spaced intervals as it passed through the wax dispersal unit. Time of pulp residence in such unit ranged from about 20 seconds to about 50 seconds. Periodic samples were taken of heated pulp as it left the conveyor and such samples were cast into paper sheets in the laboratory. In all cases the wax was completely dispersed in the paper and objectionable wax spots were missing.

After wax dispersal, the stock was defibrated, diluted and screened in a model L–40 Bird Screen. Non-fibrous impurities removed in the screen averaged about 7 pounds per ton of pulp (dry weight) and included the following:

| | Percent |
|---|---|
| Asphalt | 40 |
| Cellophane | 30 |
| Sticks and straw | 20 |
| Foil | 5 |
| Food and misc | 5 |

The asphalt was in the form of flakes and the other material was in a suitably unground state for ready removal from the pulp, thus demonstrating the efficiency of the defibrating method employed.

Stock discharged from the screen was fed to a paper making machine on which it was formed into top grade paperboards, the surfaces of which were free from wax and readily amenable to printing, gluing and other uses. None of the paper produced from pulp stock treated in accordance with the invention was downgraded or discarded because of wax on its surface.

*Example II*

During the operation described in Example I special tests were conducted to demonstrate the wax dispersal efficiency during steam heating in the horizontal screw conveyer.

In such tests, crystalline wax (low melt—120° F.–130° F.) shavings were mixed with a red dye for identification or tracing purposes. The mixture was added to unheated thickened (35% consistency) pulp entering the wax dispersal unit in an amount to give 3% (dry weight) of added wax in the pulp. Temperature in the conveyer was maintained at 185° F. by introduction of saturated steam. Pulp throughput rate was 50 tons (dry weight) per 24 hours and total residence time in the conveyer was about 45 seconds.

Samples were collected of heated thickened pulp discharging from the wax dispersal unit before such pulp entered the defiberizer. Samples were also taken of pulp discharged from the defiberizer where further agitation occurs due to the kneading action therein. These samples were cast into hand sheets in accordance with standard laboratory practice and compared. The sheets cast from the pulp samples taken directly from the wax dispersal unit showed as complete dispersal of the wax-dye mixture as did sheets cast from the defiberized pulp, thus demonstrating the efficiency of the heating method of the invention whereby wax dispersal is accomplished by thorough heating, as physically evidenced by the uniform dispersal of the above wax-dye mixture during the heating.

Since the wax was as thoroughly dispersed in the pulp before the defibration step as it was after such step, the tests demonstrate that agitation is unnecessary after heating provided the pulp has been completely and thoroughly heated throughout. As noted above, thorough heating is enhanced by agitation during such heating. However, agitation may be done after the heating if desired, but this is not too desirable as it lowers the efficiency of heating.

I claim:

1. The method of treating fiber containing stock for the production of paper which comprises forming a thickened pulp of such stock, heating such thickened pulp at a temperature sufficient to disperse wax therein but below the temperature at which asphalt is melted and dispersed therein, combing the wax dispersed thickened stock to defibrate the same by friction between the fibers without effecting substantial breaking up of foreign particles in the pulp, diluting the thus defibrated pulp to provide an aqueous suspension thereof from which said foreign particles can be removed, and removing such foreign particles from the suspension.

2. The method of treating wax-bearing waste paper stock containing solid impurities larger than individual fibers of said stock prior to formation of such stock into paper, comprising thickening said stock to a pulp having a consistency in the range from 20% to 50%, heating said thickened pulp to a temperature above the melting point of waxes contained therein and below the melting point of higher melting impurities contained therein, agitating said pulp while heating the same, refining said pulp by combing to reduce agglomerated fibers while leaving larger impurities substantially unreduced and to separate said fibers from said larger impurities, diluting said refined pulp to form a slurry and removing said larger impurities from said slurry of refined pulp by screening.

3. The method of cleaning paper stock formed from waste paper and containing as impurities wax and solid foreign particles relatively larger than fibers of said paper stock, comprising pressing said stock to form a pulp mass of a consistency above about 20%, heating said pulp at a temperature sufficient to substantially melt wax contained therein but below the temperature at which asphalt is melted, agitating said heated pulp to disperse said melted wax uniformly throughout the mass of such pulp, refining said pulp to defibrate the same to reduce agglomerates of fibers therein while leaving substantially unreduced therein said relatively larger foreign particles by kneading said wax dispersed pulp between moving spaced apart pins to thereby substantially separate said unreduced relatively larger foreign particles from fibers of said pulp, and removing said separated unreduced relatively larger foreign particles from said refined pulp stock by diluting and screening the same.

4. The method of refining waste paper stock containing solid foreign particles which comprises thickening said stock to form a pulp in the form of a kneadable mass containing substantially no free water, and kneading said thickened pulp to defibrate the same by friction between fibers to reduce agglomerates of fibers and leave individual fibers and said solid foreign particles substantially unreduced.

5. The method of treating waste paper stock containing solid foreign particles relatively larger than fibers of said stock for forming into paper, which comprises thickening said stock to a pulp having a consistency above about 20%, combing said pulp to defibrate the same and separate said relatively larger foreign particles therefrom, and substantially removing said relatively larger foreign particles from said refined stock by diluting and screening said stock.

6. The method of cleaning waste paper stock containing as impurities wax as well as solid foreign particles having a melting point higher than said wax and of a size relatively larger than fibers of said stock, comprising thickening said stock to form a pulp of a consistency for absorbing melted wax, heating said thickened pulp in a zone unsealed to the atmosphere to a temperature for melting said wax and below the melting point of said relatively larger foreign particles by injecting steam at substantially 212° F. into said pulp stock in said zone, agitating said pulp in said zone during heating thereof to substantially disperse melted wax on fibers of said pulp stock, refining said pulp stock after heating and agitation thereof to effect substantial defibration thereof and substantial separation of fibers from said relatively larger foreign particles, and removing said separated relatively larger foreign particles from said pulp stock by diluting and screening said pulp stock.

7. Apparatus for treating waste paper stock containing wax, comprising means for thickening said stock to form a pulp of a consistency above about 20% for absorbing melted wax, a chamber unsealed to the atmosphere for receiving said thickened pulp, means for injecting steam at substantially 212° F. into said chamber to heat said pulp therein to substantially melt its contained wax, means for agitating said pulp during heating thereof to effect uniform dispersal of melted wax, and combing means for defibrating the pulp after said wax dispersal.

8. Apparatus for cleaning waste paper stock containing wax as well as foreign particles having a melting point above that of said wax and of a size relatively larger than fibers of said stock, comprising a source of supply of said stock, means for thickening said stock to a pulp of a consistency for absorbing melted wax, means unsealed to the atmosphere for simultaneously agitating said thickened pulp stock while heating it to a temperature to substantially melt said wax, combing means for refining said pulp after said heating and agitation to defibrate the same and effect substantial separation of fibers thereof from said relatively larger foreign particles, and means for diluting and screening said pulp stock to remove said separated foreign particles therefrom.

9. In the method of treating waste paper stock containing wax and asphalt impurities, the steps comprising forming a thickened pulp of said stock, and heating said thickened pulp at a temperature sufficient to melt substantially the wax contained therein but below the temperature at which asphalt is melted to thereby leave asphalt in the pulp as discrete solid particles.

10. The method of treating waste paper stock containing wax and asphalt impurities and also solid foreign particles which comprises forming a thickened pulp of said stock in the form of a kneadable mass containing substantially no free water, heating said thickened pulp at a temperature sufficient to melt substantially wax contained therein but below the temperature at which asphalt is melted to thereby leave the asphalt in the pulp as discreet solid particles, refining said pulp by a combing action without grinding the same to reduce agglomerated fibers while leaving substantially unreduced therein said solid foreign particles and said asphalt, diluting said refined pulp to form a slurry, and screening such slurry to remove solid foreign particles and unreduced asphalt.

11. The method of claim 9 wherein the thickened pulp is heated at atmospheric pressure by steam and is simultaneously agitated during the heating.

References Cited in the file of this patent

UNITED STATES PATENTS

| 1,773,055 | McDougall | Aug. 12, 1930 |
| 1,833,852 | Osawa | Nov. 24, 1931 |
| 2,116,511 | Earle | May 10, 1938 |
| 2,142,823 | Nickerson et al. | Jan. 3, 1939 |
| 2,592,215 | Wandel | Apr. 8, 1952 |
| 2,697,661 | Hollis | Dec. 21, 1954 |
| 2,718,178 | Wandel | Sept. 20, 1955 |

FOREIGN PATENTS

| 689,278 | Great Britain | Mar. 25, 1953 |

UNITED STATES PATENT OFFICE

CERTIFICATE OF CORRECTION

Patent No. 2,859,110                                              November 4, 1958

Marcus E. Sanford

It is hereby certified that error appears in the above numbered patent requiring correction and that the said Letters Patent should read as corrected below.

Column 3, line 42, after "is", first occurrence, insert -- practical with currently available equipment. However, since substantially complete wax dispersal occurs at consistencies in the range from 20% to 50%, no wax dispersal advantage --; lines 69 to 72, strike out "at-mospheric pressure, thus enabling the use of ordinary saturated steam (212° F.) and also avoiding problems and"; column 4, line 4, for "stage" read -- state --; lines 19 and 20, strike out "tempera-ables," and insert instead -- temperature is not critical and will depend upon several variables, --; line 23, strike out "ture is not critical and will depend upon several vari-".

Signed and sealed this 23rd day of June 1959.

(SEAL)
Attest:
KARL H. AXLINE                                            ROBERT C. WATSON
Attesting Officer                                   Commissioner of Patents